US011432150B2

(12) United States Patent
Du et al.

(10) Patent No.: US 11,432,150 B2
(45) Date of Patent: Aug. 30, 2022

(54) METHOD AND APPARATUS FOR AUTHENTICATING NETWORK ACCESS OF TERMINAL

(71) Applicant: HUAWEI TECHNOLOGIES CO., LTD., Guangdong (CN)

(72) Inventors: Xiaoqiang Du, Shenzhen (CN); Bo Zhao, Wuhan (CN); Yu Xiao, Hangzhou (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 175 days.

(21) Appl. No.: 16/862,236

(22) Filed: Apr. 29, 2020

(65) Prior Publication Data

US 2020/0260278 A1 Aug. 13, 2020

Related U.S. Application Data

(63) Continuation of application No. PCT/CN2018/093851, filed on Jun. 29, 2018.

(30) Foreign Application Priority Data

Oct. 31, 2017 (CN) .......................... 201711048378.9

(51) Int. Cl.
*H04W 12/069* (2021.01)
*H04L 9/32* (2006.01)

(52) U.S. Cl.
CPC ......... *H04W 12/069* (2021.01); *H04L 9/3263* (2013.01)

(58) Field of Classification Search
None
See application file for complete search history.

(56) References Cited

U.S. PATENT DOCUMENTS

2005/0216736 A1* 9/2005 Smith ................. H04L 63/0823
713/168
2005/0289347 A1* 12/2005 Ovadia ................. H04L 9/3263
713/171

(Continued)

FOREIGN PATENT DOCUMENTS

CN 101159640 A 4/2008
CN 101431517 A 5/2009

(Continued)

OTHER PUBLICATIONS

3GPP TR 33.820 V8.3.0 (Dec. 2009), 3rd Generation Partnership Project; Technical Specification Group Service and System Aspects; Security of H(e)NB; (Release 8), Dec. 18, 2009 (Dec. 18, 2009), pp. 1-99, XP051296537.

(Continued)

*Primary Examiner* — Brandon Hoffman
(74) *Attorney, Agent, or Firm* — Womble Bond Dickinson (US) LLP

(57) ABSTRACT

A system and method for authenticating network access of a terminal is described. The method may include sending, by the terminal, a user identity authentication request including first authentication information and second authentication information to an authentication server, where the first authentication information is used to authenticate a user identity of the terminal, and the second authentication information is used to determine a platform corresponding to the terminal. The method may also include after receiving user identity authentication acknowledgment information sent by the authentication server, sending, by the terminal to the authentication server, a platform identity authentication request including third authentication information used to determine the platform corresponding to the terminal. The authentication server sends platform identity authentication acknowledgment information to the terminal when deter- (Continued)

mining that the platform corresponding to the second authentication information is consistent with the platform corresponding to the third authentication information.

20 Claims, 10 Drawing Sheets

(56) References Cited

U.S. PATENT DOCUMENTS

| | | | |
|---|---|---|---|
| 2011/0067095 A1* | 3/2011 | Leicher | H04L 63/062 726/10 |
| 2011/0238996 A1 | 9/2011 | Xiao et al. | |
| 2011/0239271 A1* | 9/2011 | Xiao | H04L 63/0869 726/1 |
| 2013/0046980 A1 | 2/2013 | Shah et al. | |
| 2014/0304797 A1* | 10/2014 | Fu | G06F 21/335 726/10 |
| 2015/0067813 A1* | 3/2015 | Cha | H04L 63/0807 726/10 |
| 2015/0095638 A1 | 4/2015 | Smith et al. | |

FOREIGN PATENT DOCUMENTS

| | | |
|---|---|---|
| CN | 102204305 A | 9/2011 |
| CN | 102740296 A | 10/2012 |
| CN | 103023911 A | 4/2013 |
| CN | 103581203 A | 2/2014 |
| CN | 104580250 A | 4/2015 |
| EP | 2222014 A1 | 8/2010 |

OTHER PUBLICATIONS

Huawei: "pCR to TS 6.2 Binding of HPM ID and Device ID", 3GPP Draft; S3-092107-PCR TO TS 6.2 Binding of HPM ID and Device ID, 3GPP TSG-SA3 #57, Nov. 16-20, 2009, Dublin, Ireland, total 3 pages. XP050398603.

TCG Software Stack (TSS) Specification Version 1.2, Level 1, Part1: Commands and Structures, Jan. 6, 2006. total 742 pages.

TPM Main Part 2 TPM Structures, Specification version 1.2, Level 2 Revision 116, Mar. 1, 2011. total 201 pages.

TPM Main Part 3 Commands, Specification Version 1.2, Level 2 Revision 116, Mar. 1, 2011, total 339 pages.

* cited by examiner

METHOD AND APPARATUS FOR AUTHENTICATING NETWORK ACCESS OF TERMINAL

CROSS-REFERENCE TO RELATED APPLICATIONS

This application is a continuation of International Application No. PCT/CN2018/093851, filed on Jun. 29, 2018, which claims priority to Chinese Patent Application No. 201711048378.9, filed on Oct. 31, 2017. The disclosures of the aforementioned applications are hereby incorporated by reference in their entireties.

TECHNICAL FIELD

This application relates to the field of mobile Internet technologies, and in particular, to a method and an apparatus for authenticating network access of a terminal.

BACKGROUND

Currently, mobile terminals and mobile Internet technologies are developing rapidly, and most mobile terminals can access the Internet and remote networks such as a cloud platform. However, while greatly facilitating users, information mobility also makes the mobile terminal an attack target, causing a serious network security problem.

Due to vulnerability of the mobile terminal in network security, malicious code, such as a virus, is easily implanted into the mobile terminal by an attacker. Therefore, the attacker can easily obtain secret data, such as a user account and a password, that are used in the mobile terminal. Based on the secret data, the attacker can access a sensitive service of a user of the mobile terminal by simulating the user, and then obtain private data stored in the cloud by the user. Consequently, privacy of the user is disclosed. After obtaining the password of the user, the attacker can also simulate the user of the mobile terminal to access a network. If the network or a cloud server accessed by the mobile terminal is attacked by using the mobile terminal attacked by the malicious code such as the virus, resources such as an infrastructure, network storage, data, and a service shared by various users in the network are also damaged. Consequently, robustness and stability of an entire network framework are affected, and private data of other users on a network platform is also seriously threatened.

In some systems, when a mobile terminal requests to access a network, a security problem of accessing the network by the mobile terminal is resolved by using a trusted platform module (TPM) and based on a trusted network connection (TNC) architecture. In other words, a network side needs to perform, by using the TPM and the TNC architecture, a trusted network connection authentication process on the mobile terminal that accesses the network side, and allows, only when authentication succeeds, the mobile terminal to access the network side. Usually, in the trusted network connection authentication process, the network side needs to separately perform user identity authentication, platform identity authentication, and platform integrity authentication on the mobile terminal that requests to access the network side. The mobile terminal is allowed to access the network only when all the foregoing three authentication processes succeed.

However, in an existing trusted network connection authentication process, user identity authentication and platform identity authentication are independent processes, and are not necessarily associated with each other. Therefore, there is a risk of being attacked by an attacker. For example, the attacker intercepts a user identity certificate sent by another authorized mobile terminal that has accessed a network, simulates the authorized mobile terminal to complete user identity authentication, and then uses platform information of the attacker to complete platform identity authentication and platform integrity authentication, so that the attacker can access the network by using user identity information of the another authorized mobile terminal, causing a potential network security risk.

In conclusion, in a trusted network connection authentication process of a mobile terminal, because user identity authentication of the mobile terminal and platform identity authentication of the mobile terminal are two independent processes, an attacker can easily attack a network by simulating user identity information of another authorized mobile terminal, causing a potential network security risk.

SUMMARY

This application provides a method and an apparatus for authenticating network access of a terminal, to resolve a problem that there is a potential network security risk because in an existing trusted network connection authentication process for a mobile terminal, an attacker can easily attack a network by simulating user identity information of another authorized mobile terminal.

According to a first aspect, an embodiment of this application provides a method for authenticating network access of a terminal. The method includes: sending, by the terminal, a user identity authentication request including first authentication information and second authentication information to an authentication server; after receiving the user identity authentication request, performing, by the authentication server, user identity authentication on the terminal based on the first authentication information, determining, based on the second authentication information, a platform corresponding to the terminal, and after a user identity authentication certificate is authenticated, sending, by the authentication server, user identity authentication acknowledgment information to the terminal; after receiving the user identity authentication acknowledgment information, sending, by the terminal to the authentication server, a platform identity authentication request carrying third authentication information; and determining, by the authentication server based on the second authentication information and the third authentication information, whether a platform corresponding to the second authentication information is consistent with a platform corresponding to the third authentication information, and after determining that a platform identity corresponding to the terminal is authenticated, and that the platform corresponding to the second authentication information is consistent with the platform corresponding to the third authentication information, sending, by the authentication server to the terminal, platform identity authentication acknowledgment information indicating that platform identity authentication of the terminal succeeds.

In the foregoing method, when requesting the authentication server to perform the user identity authentication, the terminal needs to send, to the authentication server, the second authentication information used by the authentication server to determine the platform corresponding to the terminal, and when requesting the authentication server to perform the platform identity authentication, the terminal needs to send, to the authentication server, the third authentication information used to determine the platform corresponding to the terminal. Therefore, the authentication server sends the platform identity authentication acknowledgment information to the terminal only when determining that the platform corresponding to the second authentication information is consistent with the platform corresponding to the third authentication information, to ensure that a platform of the terminal at a user identity authentication stage is consistent with a platform at a platform identity authentication stage, so that an attacker can be prevented from attacking a network by simulating user identity information of another authorized terminal in a trusted network connection authentication process, thereby avoiding a potential network security risk.

In a possible embodiment, the first authentication information may include a user identity authentication certificate, the second authentication information may include identity authentication certificate information of the platform corresponding to the terminal, and the identity authentication certificate information of the platform is used by the authentication server to determine an identity authentication certificate of the platform corresponding to the terminal. In this way, the authentication server may perform the user identity authentication on the terminal based on the first authentication information, and determine, based on the second authentication information, the identity authentication certificate of the platform corresponding to the terminal that requests the user identity authentication.

In a possible embodiment, the third authentication information may be the same as the second authentication information system, and therefore the authentication server may obtain, based on the third authentication information, the identity authentication certificate of the platform corresponding to the terminal that requests the platform identity authentication.

In a possible embodiment, the user identity authentication request may further include a first plaintext and a first ciphertext obtained by encrypting a first plaintext by using a private key for a platform identity authentication certificate. In this way, the authentication server may determine, after determining to decrypt the first ciphertext by using a public key in a platform identity authentication certificate obtained by using the second authentication information, whether an obtained second plaintext is consistent with the first plaintext. If the obtained second plaintext is consistent with the first plaintext, the authentication server determines that the platform identity authentication certificate obtained based on the second authentication information is consistent with a platform identity authentication certificate of the terminal. After determining that the second plaintext is consistent with the first plaintext, the authentication server may send the user identity authentication acknowledgment information to the terminal. In this way, after receiving the user identity authentication request, the authentication server may first determine whether the platform identity authentication certificate obtained based on the second authentication information is consistent with the platform identity authentication certificate of the terminal that sends the user identity authentication request, to prevent an unauthorized terminal from using an invalid platform identity authentication certificate to pass the user identity authentication and access a network, thereby avoiding a potential network risk.

In a possible embodiment, the platform identity authentication request may further include a third plaintext and a second ciphertext obtained by encrypting the third plaintext by using a private key for a platform identity authentication certificate. In this way, the authentication server may determine, after determining to decrypt the second ciphertext by using a public key in a platform identity authentication certificate obtained by using the third authentication information, whether an obtained fourth plaintext is consistent with the third plaintext. If the obtained fourth plaintext is consistent with the third plaintext, the authentication server determines that the platform identity authentication certificate obtained based on the third authentication information is consistent with a platform identity authentication certificate of the terminal. After determining that the third plaintext is consistent with the fourth plaintext, the authentication server may further determine whether a platform corresponding to the second authentication information is consistent with a platform corresponding to the third authentication information. In this way, after receiving the platform identity authentication request, the authentication server may first determine whether the platform identity authentication certificate obtained based on the third authentication information is consistent with the platform identity authentication certificate of the terminal that sends the platform identity authentication request, to prevent an unauthorized terminal from using an invalid platform identity authentication certificate to pass the platform identity authentication and access a network, thereby avoiding a potential network risk.

In a possible embodiment, after receiving the platform identity authentication acknowledgment information sent by the authentication server, the terminal may further send a platform integrity authentication request to the authentication server, where the platform integrity authentication request may include fourth authentication information and fifth authentication information. After receiving the platform integrity authentication request, the authentication server verifies, based on the fourth authentication information, whether platform integrity authentication of the platform corresponding to the terminal succeeds, determines, based on the fifth authentication information, the platform corresponding to the terminal, and determines whether the platform corresponding to the second authentication information is consistent with the platform corresponding to a fifth authentication information. After determining that the platform integrity authentication of the platform corresponding to the terminal succeeds, and that the platform corresponding to the second authentication information is consistent with the platform corresponding to the fifth authentication information, the authentication server sends platform integrity authentication acknowledgment information to the terminal.

Because in a platform integrity authentication process, it is further required to determine that the platform corresponding to the second authentication information is consistent with the platform corresponding to the fifth authentication information, so that it can be determined that the user identity authentication request and the platform integrity authentication request are sent by the same terminal, and further, an unauthorized terminal can be prevented from passing a platform integrity authentication request by simulating a user identity authentication certificate of another authorized terminal, thereby better avoiding a potential network risk.

In a possible embodiment, the fifth authentication information includes identity authentication certificate information of the platform corresponding to the terminal, and the platform integrity authentication request further includes a fifth plaintext and a third ciphertext obtained by encrypting the fifth plaintext by using a private key for an identity authentication certificate of the platform corresponding to the terminal. After receiving the platform integrity authentication request, the authentication server may determine, based on the fifth authentication information, the identity authentication certificate of the platform corresponding to the terminal; obtain a public key in a platform identity authentication certificate; decrypt the third ciphertext based on the public key to obtain a sixth plaintext; determine whether the fifth plaintext is consistent with the sixth plaintext; and after determining that the fifth plaintext is consistent with the sixth plaintext, determine whether the platform corresponding to the second authentication information is consistent with the platform corresponding to the fifth authentication information. In this way, after receiving the platform integrity authentication request, the authentication server may first determine whether the platform identity authentication certificate obtained based on the fifth authentication information is consistent with the platform identity authentication certificate of the terminal that sends the platform integrity authentication request, to prevent an unauthorized terminal from using an invalid platform identity authentication certificate to pass the platform identity authentication and access a network, thereby avoiding a potential network risk.

In a possible embodiment, the first authentication information is a user identity authentication certificate, the second authentication information, the third authentication information, and the fifth authentication information are all identity authentication certificate information of the platform corresponding to the terminal, and the fourth authentication information is a platform integrity measurement value used to perform the platform integrity authentication, where the identity authentication certificate information is used by the authentication server to determine the identity authentication certificate of the platform corresponding to the terminal. Therefore, the authentication server can verify, based on the first authentication information, whether the platform identity authentication of the terminal succeeds, obtain the identity authentication certificate of the platform based on the second authentication information, the third authentication information, and the fifth authentication information, and verify, based on the fourth authentication information, whether the platform integrity authentication of the terminal succeeds.

According to a second aspect, an embodiment of this application provides a terminal for authenticating network access of the terminal, including a transceiver, a memory, and a processor, where the transceiver is used for communication between an authentication server and the terminal, the memory stores a computer program, and the processor invokes the computer program stored in the memory, to implement the method performed by the terminal in the first aspect and any possible embodiment of the first aspect.

According to a third aspect, an embodiment of this application provides an authentication server for authentication network access of a terminal, including a transceiver, a memory, and a processor, where the transceiver is used for communication between the authentication server and the terminal, the memory stores a computer program, and the processor invokes the computer program stored in the memory, to implement the method performed by the authentication server in the first aspect and any possible embodiment of the first aspect.

According to a fourth aspect, an embodiment of this application provides a computer readable storage medium, where the readable storage medium stores a computer program, and when the computer program is run by a computer, the computer can implement functions performed by the terminal in the first aspect and any possible embodiment of the first aspect.

According to a fifth aspect, an embodiment of this application provides a computer readable storage medium, where the readable storage medium stores a computer program, and when the computer program is run by a computer, the computer can implement functions performed by the authentication server in the first aspect and any possible embodiment of the first aspect.

According to a sixth aspect, an embodiment of this application provides a computer program product, and when the computer program product is run by a computer, the computer can implement functions performed by the terminal in the first aspect and any possible embodiment of the first aspect.

According to a seventh aspect, an embodiment of this application provides a computer program product, and when the computer program product is run by a computer, the computer can implement functions performed by the authentication server in the first aspect and any possible embodiment of the first aspect.

According to an eighth aspect, an embodiment of this application provides a system for authenticating network access of a terminal, where the system includes the terminal described in the second aspect and the authentication server described in the third aspect.

DESCRIPTION OF EMBODIMENTS

To make the objectives, technical solutions, and advantages of this application clearer, the following further describes this application in detail with reference to the accompanying drawings.

Figure 1:
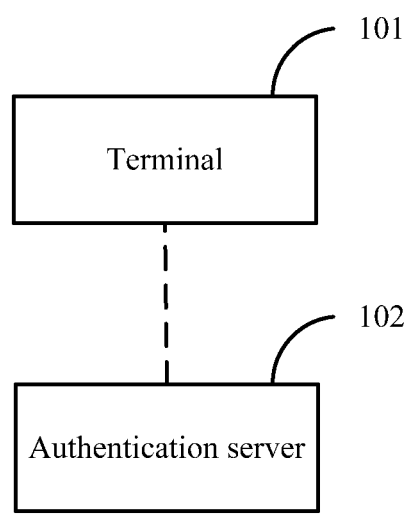
FIG. 1 is a schematic architectural diagram of a system for authenticating network access according to an embodiment of this application.

As shown in FIG. 1, a method for authenticating network access of a terminal according to an embodiment of this application may be implemented by a system including a terminal 101 and an authentication server 102.

It should be understood that the terminal 101 in this embodiment of this application may be a device configured to provide voice and/or data connectivity for a user, a handheld device with a wireless connection function, or another processing device connected to a wireless modem, including but not limited to a mobile terminal, a PC (personal computer) terminal, and a smart home appliance. The terminal device may be alternatively a wireless terminal. The wireless terminal may communicate with one or more core networks by using a radio access network (RAN). The wireless terminal may be a mobile terminal, such as a mobile phone (also referred to as a "cellular" phone) and a computer with a mobile terminal. The computer with a mobile terminal may be, for example, a portable, pocket-sized, handheld, computer built-in, or vehicle-mounted mobile apparatus, which exchanges voice and/or data with the radio access network. For example, the wireless terminal may be alternatively a device such as a personal communications service (PCS) phone, a cordless telephone set, a session initiation protocol (SIP) phone, a wireless local loop (WLL) station, or a personal digital assistant (PDA). The wireless terminal may also be referred to as a system, a subscriber unit, a subscriber station, a mobile station, a mobile station (Mobile), a remote station, an access point (AP), a remote terminal, an access terminal, a user terminal, a user agent, a user device, or user equipment (UE). This is not limited in this embodiment of this application.

The authentication server 102 in this embodiment of this application corresponds to a terminal used on a user side, and is configured to perform, on a server side, user identity authentication, platform identity authentication, and platform integrity authentication on a terminal that requests to access a network. The authentication server 102 may be a server-end carrier configured to determine a client, may have a specific computing capability to provide an operation service, and can communicate with the terminal to respond to a request of the terminal.

Figure 2:
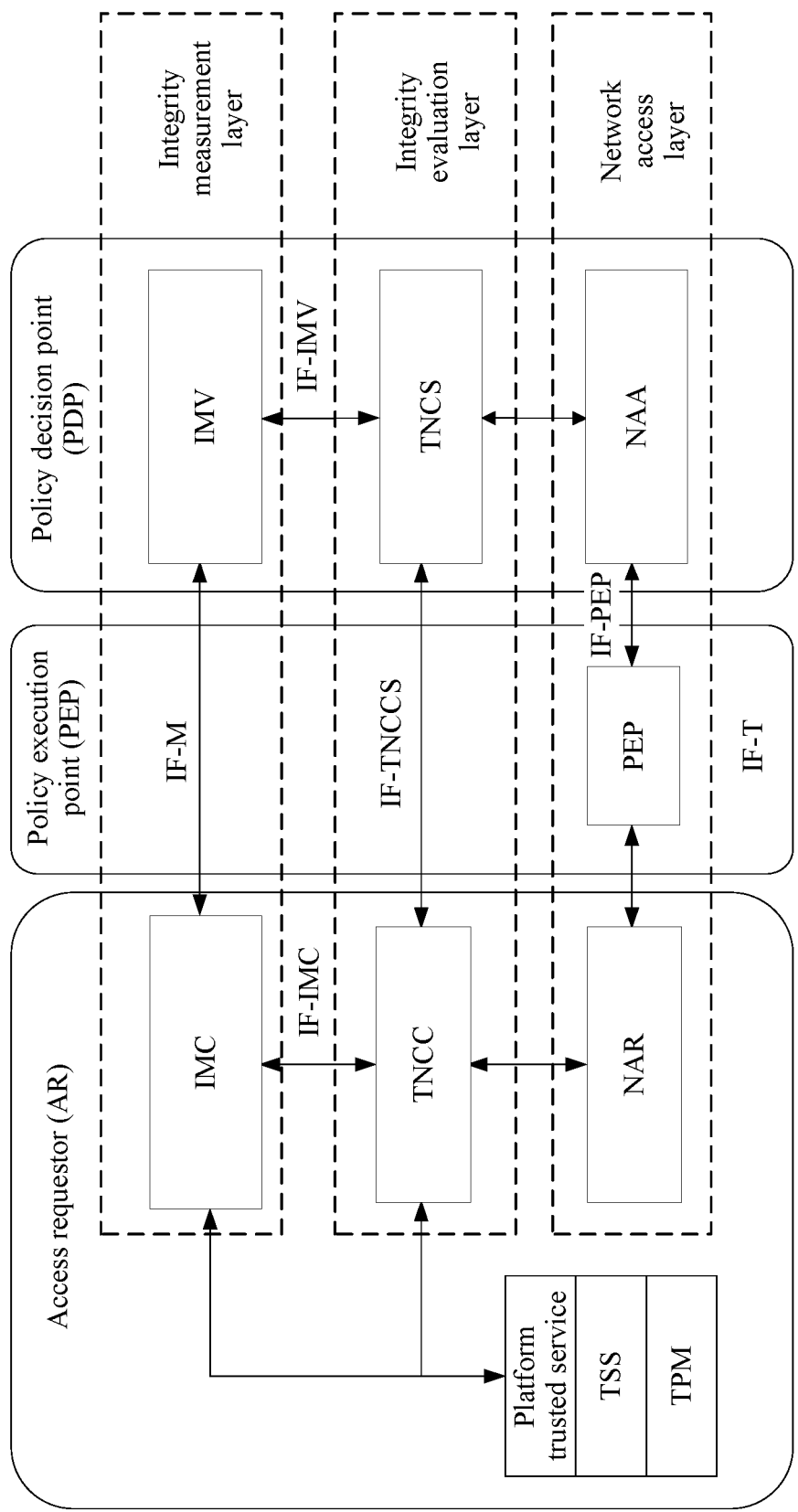
FIG. 2 is a schematic architectural diagram of a trusted network connection authentication process according to an embodiment of this application.

Before accessing a network, the terminal 101 undergoes trusted network connection authentication performed by the authentication server 102. A TNC architecture shown in FIG. 2 is used as an example to describe a complete trusted network connection authentication process.

(1) Before accessing a network, a TNC client (TNCC) needs to discover and load all integrity measurement collectors (IMCs) and initialize the IMCs, including but not limited to defining a connection identity ( ) and an IMC ID. To keep an effective connection between the TNCC and the IMC, in a process of loading the IMC, the TNCC needs to verify integrity of the IMC. In addition, a TNC server (TNCS) also loads and initializes an integrity measurement verifier (IMV).

(2) An access requester (AR) is automatically triggered by a system or is triggered by a user, to apply to a policy enforcement point (PEP) for network access.

(3) The PEP requests a component, namely, an network access authority (NAA), of a policy decision point (PDP) to perform access authentication. Then, the PDP verifies user validity of the AR (in other words, performs user identity authentication, to be specific, authenticates a user identity of a mobile terminal), verifies authenticity of a trusted platform module in the mobile terminal (in other words, performs platform identity authentication, to be specific, authenticates an identity of the trusted platform module in the mobile terminal based on a platform identity authentication certificate (such as an attestation identity key (AIK) certificate), and verifies component configuration integrity and the like of the trusted platform module (in other words, performs platform integrity authentication, to be specific, authenticates integrity of the trusted platform module in the mobile terminal). The first verification is completed at a network access layer, and the last two verifications are completed at an integrity evaluation layer.

(4) First, the PDP performs user identity authentication on the AR. If the authentication succeeds, the NAA instructs the TNCS to start a next step of authentication.

(5) The PDP performs platform identity authentication on the AR based on an AIK certificate of a trusted platform by using the TNCS, to authenticate authenticity and validity of the platform.

(6) If the trusted platform of the AR is real and valid, the TNCS instructs the IMV to start platform integrity authentication. Similarly, the TNCC also instructs the IMC to prepare for integrity information collection.

(7) The TNCC and the TNCS maintain a TNCCS session, and exchange an integrity request and response information until an entire authentication process is completed.

(8) The TNCS sends an integrity report message to a corresponding IMV for processing. The IMV may provide an integrity evaluation result and send the result to the TNCS.

(9) Similarly, the TNCC sends a challenge message to a corresponding IMC, and after processing, the IMC sends an integrity report message to the TNCC for sending.

(10) After platform authentication is completed, the TNCS summarizes authentication results, forms a suggestion, and sends the suggestion to the NAA.

(11) The NAA sends an indication to the PEP to indicate an access decision of the NAA, and the NAA also sends a final decision of the NAA to the TNCS, and the TNCS sends the final decision to the TNCC. The NAA usually notifies a network access requestor (NAR) component of the AR of an execution decision of the NAA.

The terminal 101 in this embodiment of this application may serve as the access requester in trusted network connection authentication, and the authentication server 102 may be the PDP in the TNC architecture.

The trusted network connection authentication process is shown in FIG. 2. Before a mobile terminal accesses a mobile network, user identity authentication, platform identity authentication, and platform integrity authentication need to be separately performed on the mobile terminal. In an existing trusted network connection authentication process, user identity authentication and platform identity authentication are two independent processes, and therefore, there is a risk of being attacked by an attacker. For example, the attacker intercepts a user identity certificate sent by another mobile terminal that has accessed the network, assumes another authorized mobile terminal to complete the user identity authentication, and then uses platform information of the attacker to complete the platform identity authentication and the platform integrity authentication. In this way, the attacker can use a user identity of another accessor to connect to the network, causing a potential network security risk.

Based on the trusted network connection authentication architecture shown in FIG. 2, at a platform identity authentication stage, platform identity authentication needs to be performed based on a trusted platform module (TPM) and a trusted platform service of a terminal, for example, the platform identity authentication is performed based on a platform identity authentication certificate of the trusted platform module. Based on a TPM related standard, and by using an integrated key and an encryption/decryption operating engine, the trusted platform module can provide a hardware-based security storage function for sensitive information. The TPM standard is formulated by an international industrial standard organization, namely, the Trusted Computing Group (TCG). In this standard, a TPM chip that includes a key generation function, an encryption/decryption calculation function, a security storage function, and a tamper-proofing function is embedded into a computer system, so that an unauthorized user cannot access or change data inside the TPM chip, thereby ensuring security of identity authentication and data encryption. In trusted network connection authentication, a terminal that requests to access a network is allowed to access a network only when it is ensured that the terminal is protected by the trusted platform module, so that an insecure terminal that has no trusted platform module or whose trusted platform module fails network access authentication is prevented from accessing the network. Such an insecure terminal usually has malicious software or is infected with malicious software.

During implementation, the terminal 101 may obtain the platform identity authentication certificate by using a TPM security chip of the terminal 101. The TPM security chip is a small chip system that includes a cryptographic operation component and a storage component, and usually includes components such as a central processing unit (CPU), a memory, an input/output (I/O) port, a cryptographic operator, a random number generator, and an embedded operating system.

The platform identity authentication certificate is a certificate obtained by the terminal from a private certificate authority and is used to attest that content stored in the trusted platform module or content generated by the trusted platform module is trusted. For example, the AIK certificate issued by a platform authentication device such as the private certificate authority can be used as a platform identity authentication certificate, and an AIK key is a non-migratable platform identity attestation key generated by the trusted platform module based on a unique endorsement key (EK), and the AIK certificate includes an AIK public key. The platform identity authentication certificate may be stored in a platform authentication device that generates the platform identity authentication certificate, or stored in a device such as a server that is specifically configured to store the platform identity authentication certificate. The platform authentication device of the platform identity authentication certificate may be a certificate server configured to issue the platform identity authentication certificate.

Embodiments of this application provide a method and an apparatus for authenticating network access of a terminal. By using the method, in a trusted network connection authentication process for a terminal, an authentication server needs to respectively obtain second authentication information and third authentication information of the terminal at a user identity authentication stage and a platform identity authentication stage, and then determine whether a platform identity corresponding to the second authentication information is consistent with a platform identity corresponding to the third authentication information. The authentication server sends platform identity authentication information to the terminal only when the platform identities are consistent, so that a user identity authentication process of the mobile terminal and a platform identity authentication process of the mobile terminal are no longer independent from each other in trusted network connection authentication. Therefore, an attacker is prevented from attacking a network by simulating information of another authorized terminal in the platform identity authentication process, so that a potential network security risk can be avoided.

Figure 3:
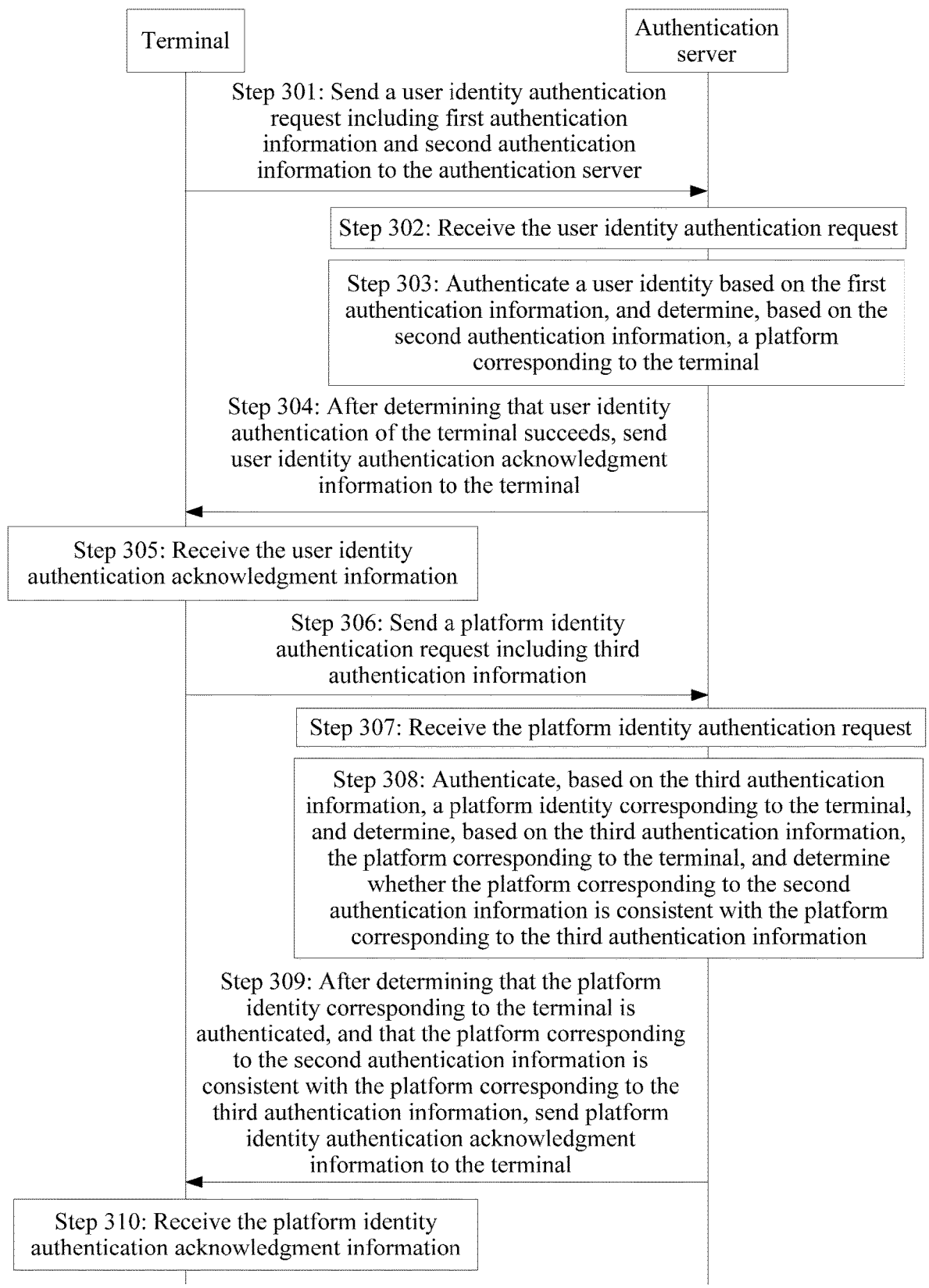
FIG. 3 is a schematic flowchart of a method for authenticating network access according to an embodiment of this application.

As shown in FIG. 3, a method for authenticating network access of a terminal according to an embodiment of this application includes the following steps:

Step 301: The terminal sends a user identity authentication request including first authentication information and second authentication information to an authentication server.

Step 302: The authentication server receives the user identity authentication request sent by the terminal.

Step 303: The authentication server authenticates a user identity based on the first authentication information, and determines, based on the second authentication information, a platform corresponding to the terminal.

Step 304: After determining that user identity authentication of the terminal succeeds, the authentication server sends user identity authentication acknowledgment information to the terminal.

Step 305: The terminal receives the user identity authentication acknowledgment information.

Step 306: The terminal sends a platform identity authentication request including third authentication information to the authentication server.

Step 307: The authentication server receives the platform identity authentication request.

Step 308: The authentication server authenticates a platform identity corresponding to the terminal, determines, based on the third authentication information, the platform corresponding to the terminal, and determines whether a platform corresponding to the second authentication information is consistent with a platform corresponding to the third authentication information.

Step 309: After determining that the platform identity corresponding to the terminal is authenticated, and that the platform corresponding to the second authentication information is consistent with the platform corresponding to the third authentication information, the authentication server sends platform identity authentication acknowledgment information to the terminal.

Step 310: The terminal receives the platform identity authentication acknowledgment information.

In the foregoing method, the authentication server needs to compare, during network access authentication, whether the platform corresponding to the second authentication information is consistent with the platform corresponding to the third authentication information, and sends the platform identity authentication acknowledgment information to the terminal only when a comparison result shows that the two platforms are consistent, in other words, the user identity authentication request and the platform identity authentication request are from a terminal corresponding to a same platform. Therefore, in a trusted network connection authentication process, an attacker can be prevented from attacking a network by simulating user identity information of another authorized terminal at a platform identity authentication stage, thereby avoiding a potential network security risk. The platform corresponding to the second authentication information is a platform that is determined by the authentication server based on the second authentication information and that corresponds to the terminal, and the platform corresponding to the third authentication information is a platform that is determined by the authentication server based on the third authentication information and that corresponds to the terminal.

During implementation, according to embodiments discussed herein, if the authentication server determines that the platform corresponding to the second authentication information is inconsistent with the platform corresponding to the third authentication information, the authentication server may send platform identity authentication negative acknowledgment information to the terminal, so that the terminal cannot access the network even if user identity authentication and platform identity authentication of the terminal succeed.

Figure 4:
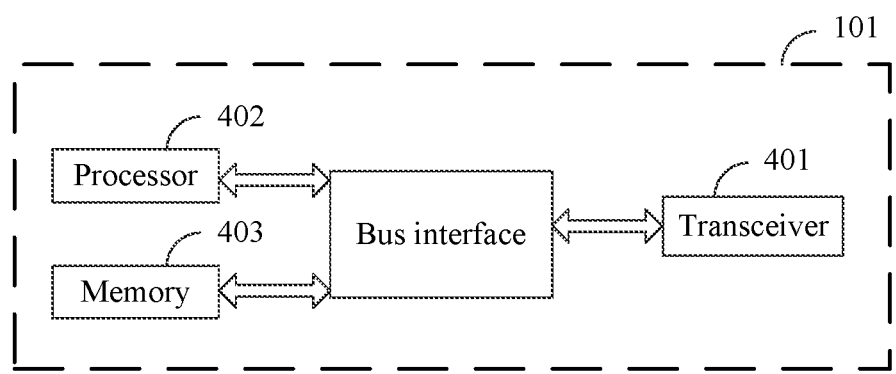
FIG. 4 is a schematic structural diagram of a terminal for authenticating network access according to an embodiment of this application.

As shown in FIG. 4, a terminal 101 according to an embodiment of this application includes a transceiver 401, a processor 402, and a memory 403.

The transceiver 401 is electrically connected to the processor 402, and the transceiver 401 may include a receiver, configured to receive a signal and send the received signal to the processor 402 to be processed by the processor 402, for example, send, to the processor 402, a received signal sent by an authentication server 102; and/or the transceiver 401 may include a transmitter, configured to send a signal under control of the processor 402, for example, send the signal to the server 102 under control of the processor 402.

The processor 402 is configured to perform various functions of the terminal and perform data processing. The processor 402 may be a central processing unit, a microprocessor, an application-specific integrated circuit, or one or more integrated circuits, and is configured to perform related operations, to implement a technical solution provided in this embodiment of this application.

The memory 403 is configured to store a software program executed by the processor 402 of the terminal 101, and is configured to implement, by using the software program, a method performed by the terminal 101 in this embodiment of this application. The memory 403 may include a high-speed random access memory, and may further include a non-volatile memory, for example, at least one disk storage component, a flash storage component, or another volatile solid-state storage component.

In a possible implementation, the terminal 101 further includes a bus interface. The processor 402 is connected to the transceiver 401 by using the bus interface, and is connected to the memory 403 by using the bus interface.

Figure 5:
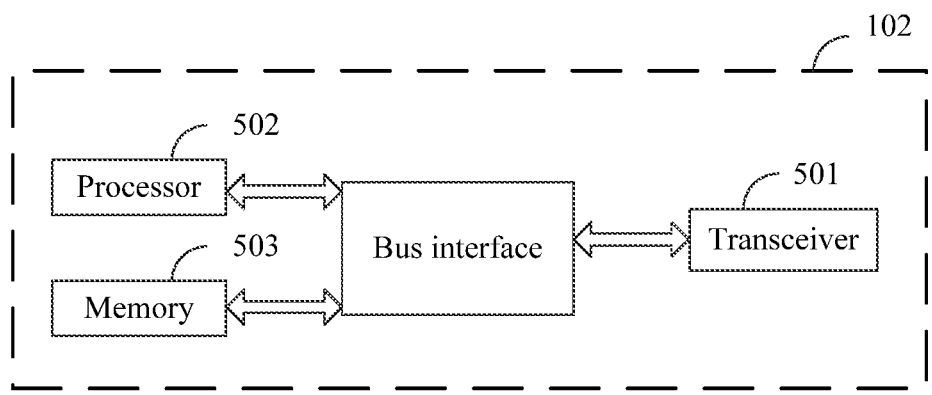
FIG. 5 is a schematic structural diagram of an authentication server for authenticating network access according to an embodiment of this application.

As shown in FIG. 5, an authentication server 102 according to an embodiment of this application includes a transceiver 501, a processor 502, and a memory 503.

The transceiver 501 is electrically connected to the processor 502, and the transceiver 501 may include a receiver, configured to receive a signal and send the received signal to the processor 502 to be processed by the processor 502, for example, send, to the processor 502, a received signal sent by a terminal 101; and/or the transceiver 501 may include a transmitter, configured to send a signal under control of the processor 502, for example, send the signal to the terminal 101 under control of the processor 502.

The processor 502 is configured to perform various functions of the authentication server and perform data processing. The processor 502 may be a central processing unit, a microprocessor, an application-specific integrated circuit, or one or more integrated circuits, and is configured to perform related operations, to implement a technical solution provided in this embodiment of this application.

The memory 503 is configured to store a software program executed by the processor 502 of the authentication server 102, to implement, by using the software program, a method performed by the authentication server 102 in this embodiment of this application. The memory 503 may include a high-speed random access memory, and may further include a non-volatile memory, for example, at least one disk storage component, a flash storage component, or another volatile solid-state storage component.

Further, the authentication server 102 further includes a bus interface. The processor 502 is connected to the transceiver 501 by using the bus interface, and is connected to the memory 503 by using the bus interface.

Optionally, in an embodiment, the first authentication information may include a user identity authentication certificate. In step 303, the authentication server 102 may determine, based on the user identity authentication certificate of the terminal 101, whether user identity authentication of the terminal succeeds. The second authentication information may include identity authentication certificate information of a platform corresponding to the terminal 101, and the information is used to determine an identity authentication certificate of the platform corresponding to the terminal 101. In step 303, the authentication server 102 may obtain, based on the identity authentication certificate information of the platform corresponding to the terminal 101, the identity authentication certificate of the platform corresponding to the terminal 101, to determine, based on the identity authentication certificate of the platform, the platform corresponding to the terminal 101.

Optionally, the third authentication information may include identity authentication certificate information of the platform corresponding to the terminal 101, and the information is used to determine an identity authentication certificate of the platform corresponding to the terminal 101. In step 308, the authentication server 102 may obtain, based on the third authentication information, the identity authentication certificate of the platform corresponding to the terminal 101, and then compare whether the identity authentication certificate is consistent with a platform identity authentication certificate obtained based on the second authentication information. If it is determined that the certificates are consistent, the authentication server 102 determines that the user identity authentication request and the platform identity authentication request are sent by the same terminal 101. In an implementation, the third authentication information may be the same as the second authentication information.

Optionally, in this embodiment of this application, platform identity authentication certificate information in the second authentication information and/or the third authentication information may be index information of a platform identity authentication certificate. For example, the platform identity authentication certificate is an AIK certificate. In an implementation, the platform identity authentication certificate information may include information about a platform authentication device that generates the AIK certificate and an index number of the platform identity authentication certificate in the platform authentication device.

In a feasible embodiment and/or implementation, the authentication server 102 may obtain the platform identity authentication certificate of the terminal based on the platform identity authentication certificate information included in the second authentication information and/or the third authentication information. During the embodiment and/or implementation, the platform identity authentication certificate information may include some or all of the following: the information about the platform authentication device that generates the platform identity authentication certificate, index information of the platform identity authentication certificate, and release number information of the platform identity authentication certificate.

For example, the platform identity authentication certificate is an AIK certificate. After receiving the user identity authentication request including the second authentication information, the authentication server 102 obtains information that is about an AIK certificate of a platform and that is in the second authentication information. If the information about the AIK certificate is information about a platform authentication device that generates the AIK certificate and index information (such as an index number) of the AIK certificate, the authentication server may query, based on the index information, the AIK certificate from the platform authentication device that generates the AIK certificate, to obtain a platform identity authentication certificate stored in the platform authentication device. After receiving the platform identity authentication request including the third authentication information, the authentication server 102 may obtain, by using a same method, a corresponding AIK certificate based on information that is about the AIK certificate of a platform and that is in the third authentication information. Then, the authentication server 102 may compare whether the AIK certificate obtained based on the second authentication information is consistent with the AIK certificate obtained based on the third authentication information, to determine whether the platform corresponding to the second authentication information is consistent with the platform corresponding to the third authentication information.

Optionally, in an embodiment, before determining whether the platform corresponding to the second authentication information is consistent with the platform corresponding to the third authentication information, the authentication server 102 may determine that a platform identity authentication certificate corresponding to the second authentication information is the same as the platform identity authentication certificate of the terminal 101 that sends the user identity authentication request, and determine that a platform identity authentication certificate corresponding to the third authentication information is the same as the platform identity authentication certificate of the terminal 101 that sends the user identity authentication request.

In an embodiment, the authentication server 102 may determine, based on a first plaintext and a first ciphertext that are included in the user identity authentication request sent by the terminal 101, whether the platform identity authentication certificate corresponding to the second authentication information is the same as the platform identity authentication certificate of the terminal that sends the user identity authentication request, and the first ciphertext is obtained by encrypting the first plaintext by using a private key for the platform identity authentication certificate of the terminal 101.

During implementation, according to embodiments discussed herein, after obtaining the platform identity authentication certificate based on the platform identity certificate information in the second authentication information, the authentication server 102 can obtain a public key in the platform identity authentication certificate. For example, the platform identity authentication certificate is an AIK certificate, and after obtaining the AIK certificate, the authentication server 102 may further obtain an AIK public key in the AIK certificate.

Then, the authentication server 102 may decrypt, based on the AIK public key, the first ciphertext carried in the user identity authentication request, and determine whether the second plaintext obtained by decrypting the first ciphertext is consistent with the first plaintext in the user identity authentication request. If the second plaintext obtained by decrypting the first ciphertext is consistent with the first plaintext, the authentication server 102 determines that the platform identity authentication certificate corresponding to the second authentication information included in the user identity authentication request is consistent with a platform identity authentication certificate to which an AIK private key used to obtain the first ciphertext by encrypting the first plaintext belongs. Otherwise, the authentication server 102 determines that the platform identity authentication certificate corresponding to the second authentication information included in the user identity authentication request is inconsistent with the platform identity authentication certificate to which the AIK private key used to obtain the first ciphertext by encrypting the first plaintext belong, and in this case, the authentication server may send user identity authentication negative acknowledgment information to the terminal, to prevent the terminal from accessing the network by using a fake platform identity authentication certificate and/or fake platform identity authentication certificate information.

In an embodiment and/or implementation, the authentication server 102 may determine, based on a third plaintext and a second ciphertext that are included in the platform identity authentication request sent by the terminal 101, whether the platform identity authentication certificate corresponding to the third authentication information is the same as the platform identity authentication certificate of the terminal that sends the user identity authentication request, and the second ciphertext is obtained by encrypting the third plaintext by using a private key for the platform identity authentication certificate of the terminal.

During implementation, according to embodiments discussed herein, after obtaining the platform identity authentication certificate based on the platform identity certificate information in the third authentication information, the authentication server 102 can obtain a public key in the platform identity authentication certificate. For example, the platform identity authentication certificate is an AIK certificate, and after obtaining the AIK certificate, the authentication server 102 may further obtain an AIK public key in the AIK certificate.

Then, the authentication server 102 may decrypt, based on the AIK public key, the second ciphertext carried in the platform identity authentication request, and determine whether a fourth plaintext obtained by decrypting the second ciphertext is consistent with the third plaintext in the platform identity authentication request. If the fourth plaintext obtained by decrypting the second ciphertext is consistent with the third plaintext, the authentication server 102 determines that the platform identity authentication certificate corresponding to the third authentication information included in the platform identity authentication request is consistent with a platform identity authentication certificate to which an AIK private key used to obtain the second ciphertext by encrypting the second plaintext belongs. Otherwise, the authentication server 102 determines that the platform identity authentication certificate corresponding to the third authentication information is inconsistent with the platform identity authentication certificate to which the AIK private key used to obtain the second ciphertext by encrypting the second plaintext belongs, and in this case, the authentication server 102 may send platform identity authentication negative acknowledgment information to the terminal, to prevent the terminal from accessing the network by using a fake platform identity authentication certificate and/or fake platform identity authentication certificate information.

Optionally, in this embodiment of this application, if the first authentication information includes the user identity authentication certificate, the second authentication information, the first plaintext, and the first ciphertext that are in the user identity authentication request may be located in an extension of the user identity authentication certificate.

In a feasible implementation, according to embodiments discussed herein, after obtaining the platform identity authentication certificate issued by the platform authentication device, the terminal may add, to request for applying to an electronic licensing authority for the user identity authentication certificate, a request used for generating extensions including information about the platform identity authentication certificate, the first plaintext, and the first ciphertext, and receive the user identity authentication certificate that includes the extensions and that is issued by the electronic licensing authority. The extension may be a subject key attestation evidence (SKAE) extension, and the electronic licensing authority may be a certification authority (CA) server used to issue a certificate.

Figure 6:
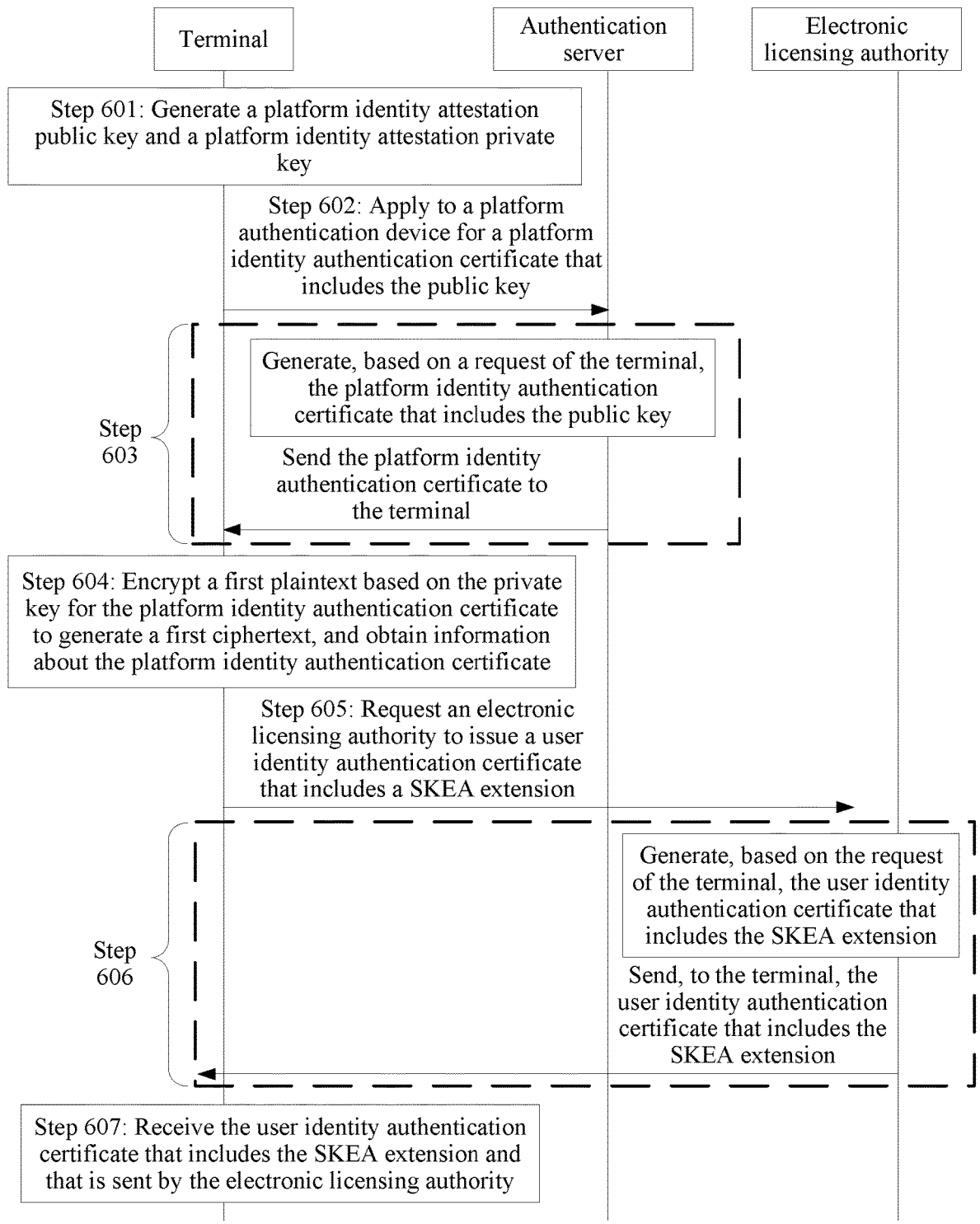
FIG. 6 is a schematic flowchart of a method used by a terminal to obtain an identity authentication certificate including an extension according to an embodiment of this application.

As shown in FIG. 6, an example in which second authentication information is platform identity authentication certificate information is used to describe specific steps in which a terminal obtains a platform identity authentication certificate and obtains a user identity authentication certificate including a SKAE extension in an embodiment of this application.

Step 601: A terminal generates a platform identity attestation public key and a platform identity attestation private key.

Step 602: The terminal applies to a platform authentication device for a platform identity authentication certificate that includes the public key.

Step 603: The platform authentication device generates, based on a request of the terminal, the platform identity authentication certificate that includes the public key, and sends the platform identity authentication certificate to the terminal.

Step 604: The terminal encrypts a first plaintext based on the private key for the platform identity authentication certificate to generate a first ciphertext, and obtains information about the platform identity authentication certificate.

Step 605: The terminal requests an electronic licensing authority to issue a user identity authentication certificate that includes a SKEA extension, where the terminal requests the electronic licensing authority to add the first plaintext, the first ciphertext, and platform identity authentication certificate information to the SKEA extension.

Step 606: The electronic licensing authority generates, based on the request of the terminal, the user identity authentication certificate that includes the SKEA extension, and sends the user identity certificate to the terminal.

Step 607: The terminal receives the user identity authentication certificate that includes the SKEA extension and that is sent by the electronic licensing authority.

In the foregoing method, the terminal can obtain the platform identity authentication certificate from the platform authentication device, and obtain, from the electronic licensing authority, the user identity authentication certificate that includes the SKEA extension, where the user identity authentication certificate obtained by the terminal includes the first plaintext, the first ciphertext, and the platform identity authentication certificate information. The information about the platform identity authentication certificate may be information about the platform authentication device that generates the platform identity authentication certificate, index information of the platform identity authentication certificate, a release number used by the platform identity authentication certificate, or the like.

Figure 7:
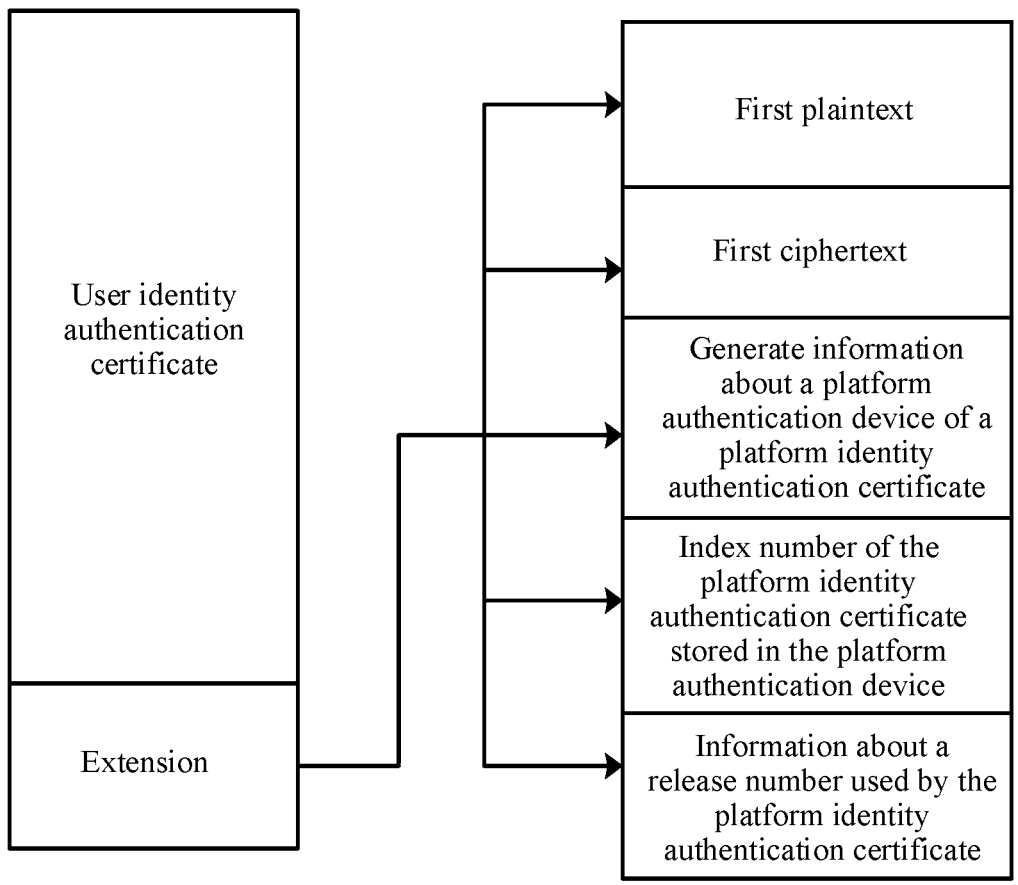
FIG. 7 is a schematic diagram of an identity authentication certificate including an extension according to an embodiment of this application.

In a possible embodiment and/or implementation, if the information about the platform identity authentication certificate includes the information about the platform authentication device that generates the platform identity authentication certificate, the index number of the platform identity authentication certificate stored in the platform authentication device, and information about the release number used by the platform identity authentication certificate, a possible format of the user identity authentication certificate that is obtained by the terminal and that includes the first plaintext, the first ciphertext, and the platform identity authentication certificate information is shown in FIG. 7, where the information about the platform identity authentication certificate includes the information about the platform authentication device that generates the platform identity authentication certificate, the index number of the platform identity authentication certificate stored in the platform authentication device, and the information about the release number used by the platform identity authentication certificate. During implementation, if an extension in the user identity authentication certificate is an SKAE extension, the first plaintext may be used as a Certify_Info field of the SKAE extension, the first ciphertext may be used as a signature field of the SKAE extension, the information about the platform authentication device that generates the platform identity authentication certificate may be used as an AIK_serial_nub field of the SKAE extension, the index number of the platform identity authentication certificate stored in the platform authentication device may be used as a PCA_authority_info field of the SKAE extension, and the information about the release number used by the platform identity authentication certificate may be used as a Tcg_spec_release field of the SKAE extension.

In a possible embodiment and/or implementation, the first plaintext in the user identity authentication request sent by the terminal 101 may be a non-migratable SKAE key encrypted by using the private key for the platform identity authentication certificate. Because the SKAE key is encrypted by using the private key for the platform identity authentication certificate, security of the SKAE key is authenticated by the platform identity authentication certificate. After receiving the user identity authentication request, the authentication server 102 may obtain the SKAE key and use the SKAE key in scenarios such as transport layer security (TLS) and hyper text transfer protocol over secure socket layer (HTTPS), so that the terminal 101 does not need to separately send the SKAE key in the foregoing scenarios.

Optionally, in this embodiment of this application, after receiving the platform identity authentication acknowledgment information sent by the authentication server 102, the terminal 101 may send a platform integrity authentication request to the authentication server 102, and add fourth authentication information and fifth authentication information to the request. The fourth authentication information is used by the authentication server 102 to verify whether platform integrity authentication of the platform corresponding to the terminal 101 succeeds, and the fifth authentication information is used by the authentication server 102 to determine the platform corresponding to the terminal 101, and to determine whether the platform determined based on the second authentication information is consistent with the platform determined based on the fifth authentication information. The authentication server 102 may determine, based on the fourth authentication information, whether the platform integrity authentication of the platform corresponding to the terminal 101 succeeds, determine, based on the fifth authentication information, the platform corresponding to the terminal, and determine whether the platform determined based on the second authentication information is consistent with the platform determined based on the fifth authentication information. If the platform determined based on the second authentication information is consistent with the platform determined based on the fifth authentication information, the authentication server 102 determines that the user identity authentication request and the platform integrity authentication request are sent by the same terminal 101. If the authentication server determines that integrity authentication of the terminal 101 succeeds, and that the user identity authentication request and the platform integrity authentication request are sent by the same terminal 101, the authentication server 102 sends platform integrity authentication acknowledgment information to the terminal 101.

In addition, during implementation, if the authentication server 102 determines, based on the second authentication information and the fifth authentication information, that the platform corresponding to the second authentication information is inconsistent with the platform corresponding to the fifth authentication information, the authentication server 102 determines that the user identity authentication request and the platform integrity authentication request are not sent by a same terminal, and in this case, the authentication server 102 may send platform integrity authentication negative acknowledgment information to the terminal 101.

Optionally, in an embodiment, the fifth authentication information may include identity authentication certificate information of the platform corresponding to the terminal, and the information is used by the authentication server to obtain an identity authentication certificate of the platform. At a platform integrity authentication stage, the authentication server 102 may obtain an integrity authentication certificate of the platform based on the identity authentication certificate information. Further, the authentication server 102 may compare an integrity authentication certificate of the platform that is obtained based on the second authentication information with an integrity authentication certificate of the platform that is obtained based on the fifth authentication information, and determine, based on a comparison result, whether the platform corresponding to the second authentication information is consistent with the platform corresponding to a fifth authentication information.

Optionally, in this embodiment of this application, the platform integrity authentication request sent by the terminal 101 may further include a fifth plaintext and a third ciphertext obtained by encrypting the fifth plaintext by using a private key for the platform identity authentication certificate. Before determining whether the platform corresponding to the second authentication information is consistent with the platform corresponding to the fifth authentication information, the authentication server 102 may determine the platform identity authentication certificate based on the identity authentication certificate information in the fifth authentication information and obtain a public key in the platform identity authentication certificate, decrypt the third ciphertext based on the public key to obtain a sixth plaintext, and then determine that the sixth plaintext is consistent with the fifth plaintext. If it is determined that the sixth plaintext is inconsistent with the fifth plaintext, the authentication server 102 may send platform integrity authentication negative acknowledgment information to the terminal 101, and in this case, the authentication server may no longer determine, based on platform integrity authentication information, whether the platform integrity authentication of the platform corresponding to the terminal succeeds.

During implementation, according to embodiments discussed herein, after obtaining the platform identity authentication certificate based on platform identity certificate information in the fifth authentication information, the authentication server 102 can obtain a public key in the platform identity authentication certificate. For example, the platform identity authentication certificate is an AIK certificate, and after obtaining the AIK certificate, the authentication server 102 may further obtain an AIK public key in the AIK certificate.

Then, the authentication server 102 may decrypt, based on the AIK public key, the third ciphertext carried in the platform integrity authentication request, and determine whether the sixth plaintext obtained by decrypting the third ciphertext is consistent with the fifth plaintext in the platform integrity authentication request. If the sixth plaintext obtained by decrypting the third ciphertext is consistent with the fifth plaintext, the authentication server 102 determines that the platform identity authentication certificate corresponding to the fifth authentication information included in the platform integrity authentication request is consistent with a platform identity authentication certificate to which an AIK private key used to obtain the third ciphertext by encrypting the fifth plaintext belongs. Otherwise, the authentication server 102 determines that the platform identity authentication certificate corresponding to the fifth authentication information is inconsistent with the platform identity authentication certificate to which the AIK private key used to obtain the third ciphertext by encrypting the fifth plaintext belongs, and in this case, the authentication server 102 may send the platform integrity authentication negative acknowledgment information to the terminal, to prevent the terminal from accessing a network by using a fake platform identity authentication certificate and/or fake platform identity authentication certificate information.

Optionally, in this embodiment of this application, the fourth authentication information may be used as a fifth plaintext in the platform integrity authentication request after being encrypted by using a private key in the platform authentication certificate, and the fourth authentication information may be information, such as a platform integrity measurement value, that is used by the authentication server 102 to verify whether the platform integrity authentication of the platform corresponding to the terminal 101 succeeds. An example in which the fourth authentication information is a platform integrity measurement value is used to describe a method used by the terminal 101 to authenticate platform integrity by using the authentication server 102 in this embodiment of this application.

After being encrypted by using the private key for the platform identity authentication certificate, the platform integrity measurement value may be added by the terminal 101 to the platform integrity authentication request as the fifth plaintext, and then the terminal 101 sends the platform integrity authentication request to the authentication server 102. The authentication server 102 may obtain the corresponding platform authentication certificate based on the fifth authentication information in the platform integrity authentication request, determine the public key in the platform identity authentication certificate, obtain the platform integrity measurement value after decrypting the fifth plaintext in the platform integrity authentication request by using the public key in the platform identity authentication certificate, and determine, based on the platform integrity measurement value, whether the platform integrity authentication of the platform corresponding to the terminal succeeds. The fifth authentication information may be the platform identity authentication certificate information, such as the information about the platform authentication device that generates the identity authentication certificate of the platform, the index information of the platform identity authentication certificate, and the information about the release number of the identity authentication certificate.

It should be noted that, in this embodiment of this application, the fifth plaintext in the platform integrity authentication request is not limited to the platform integrity measurement value encrypted by using the private key for the platform identity authentication certificate, and may also be other information encrypted by using the private key for the platform identity authentication certificate, for example, may be other data related to platform identity information of the terminal, or data that is defined in a related communications protocol or standard and that is used to perform signature and verification on the platform identity authentication certificate.

Figure 8A:
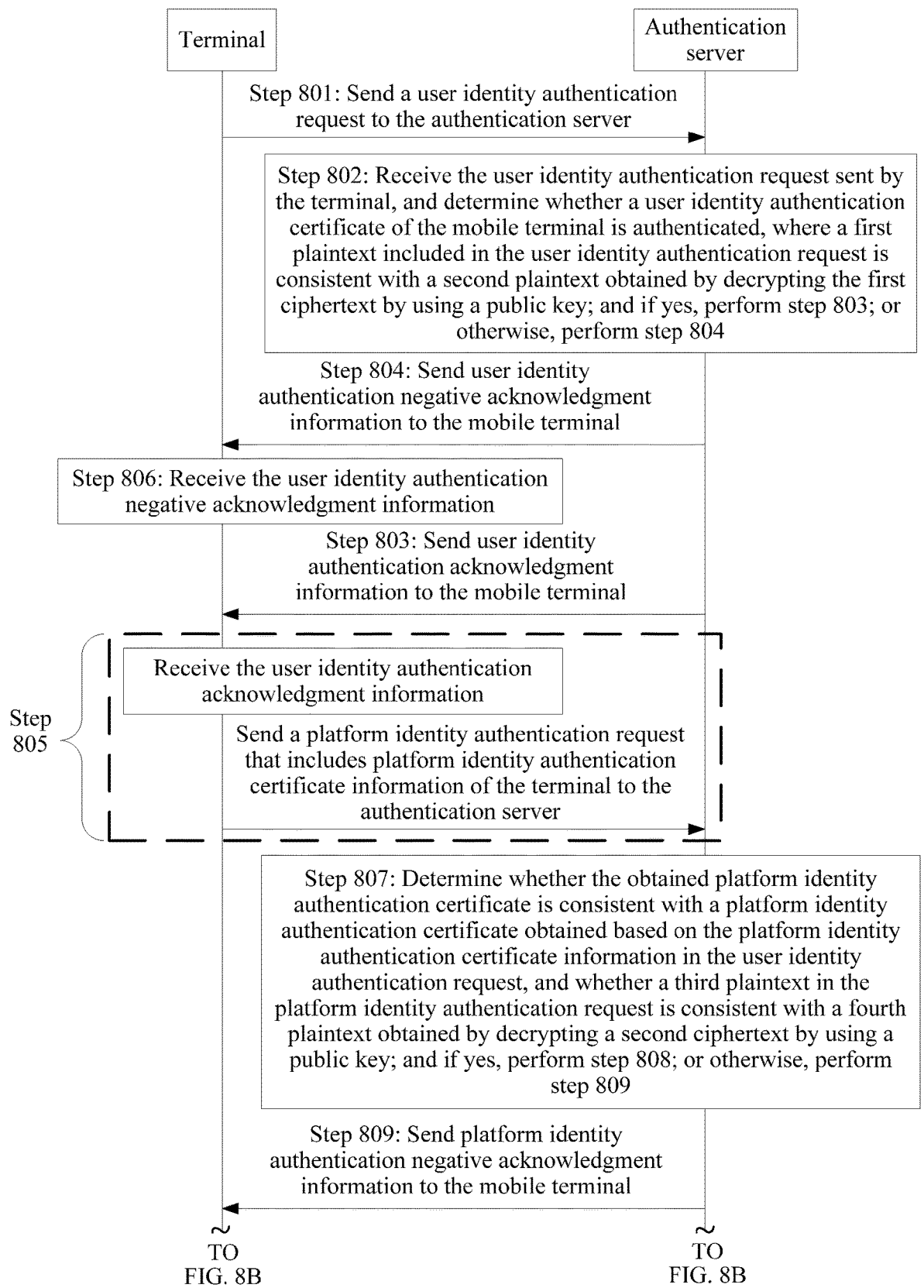
FIG. 8A and FIG. 8B are a schematic flowchart of another method for authenticating network access according to an embodiment of this application.
Figure 8B:
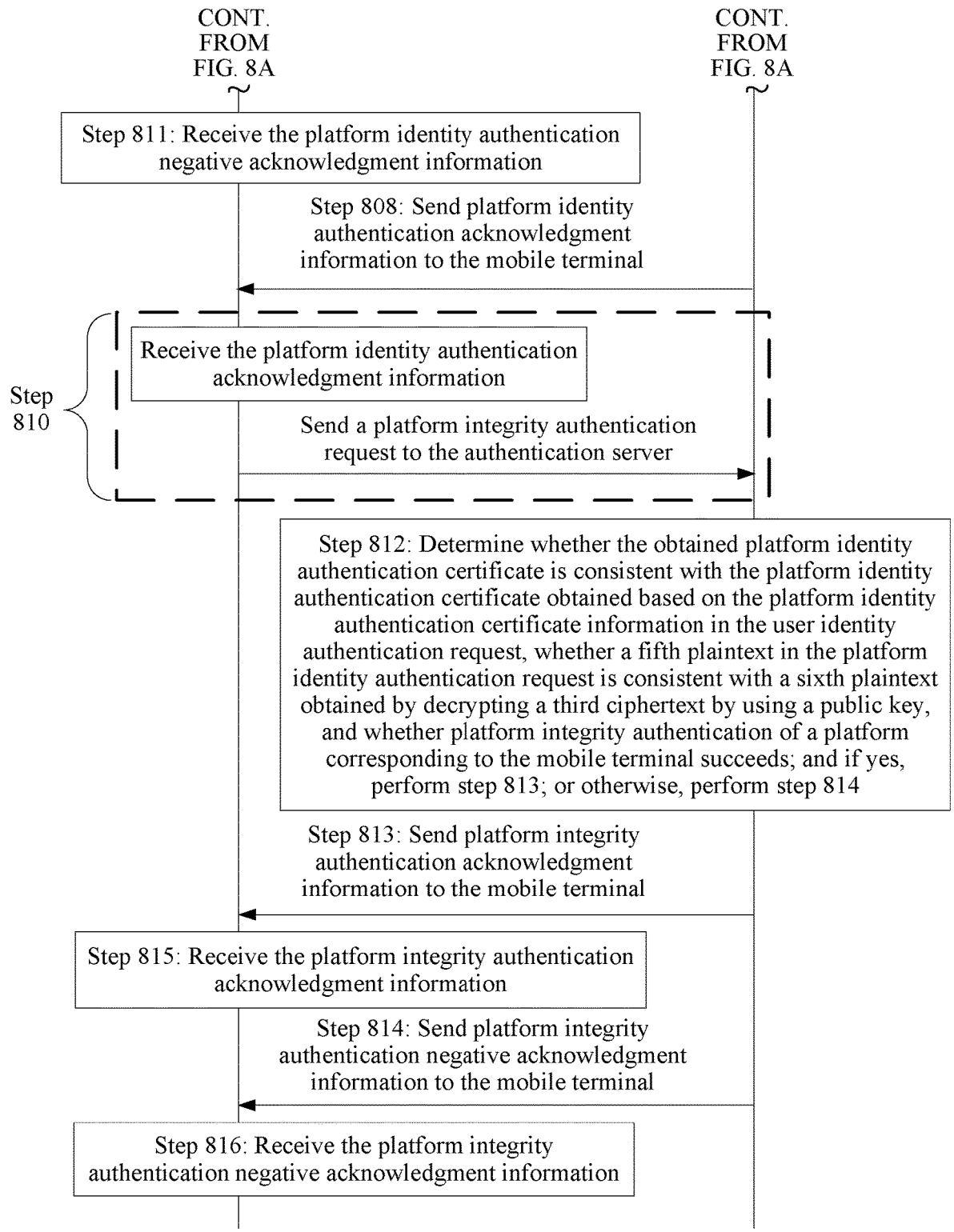

If the first authentication information is a user identity authentication certificate, the second authentication information, the third authentication information, and the fifth authentication information are the identity authentication certificate information of the platform corresponding to the terminal, and the fourth authentication information is the platform integrity measurement value of the platform, using a mobile terminal as an example, specific steps of a method for authenticating network access of a terminal according to an embodiment of this application are shown in FIG. 8, including:

Step 801: The mobile terminal sends a user identity authentication request to an authentication server, where the user identity authentication request includes a user identity authentication certificate of the mobile terminal, and an SKAE extension of the user identity authentication certificate includes a first plaintext, a first ciphertext obtained by encrypting the first plaintext by using a private key for a platform identity authentication certificate of the mobile terminal, and platform identity authentication certificate information, where the first plaintext is an SKAE key encrypted by using the private key for the platform identity authentication certificate, and the platform identity authentication certificate information includes information about a platform authentication device that generates the platform identity authentication certificate, an index number of the platform identity authentication certificate stored in the platform authentication device, and information about a release number used by the platform identity authentication certificate.

Step 802: After receiving the user identity authentication request, the authentication server obtains the platform identity authentication certificate based on the platform identity authentication certificate information in the user identity authentication request, and determines whether the user identity authentication certificate of the mobile terminal is authenticated, and whether the first plaintext included in the user identity authentication request is consistent with a second plaintext obtained by decrypting the first ciphertext by using a public key; and if yes, performs step 803; or otherwise, performs step 804, where the public key is a public key in a platform authentication certificate determined based on the platform identity authentication certificate information.

Step 803: The authentication server sends user identity authentication acknowledgment information to the mobile terminal, and then performs step 805.

Step 804: The authentication server sends user identity authentication negative acknowledgment information to the mobile terminal, and then performs step 806.

Step 805: After receiving the user identity authentication acknowledgment information, the mobile terminal sends a platform identity authentication request that includes the platform identity authentication certificate information of the terminal to the authentication server, where the platform identity authentication request further includes a third plaintext and a second ciphertext obtained by encrypting the third plaintext by using a private key for the platform identity authentication certificate, and then step 807 is performed, where the platform identity authentication certificate information includes the information about the platform authentication device that generates the platform identity authentication certificate, the index number of the platform identity authentication certificate stored in the platform authentication device, and the information about the release number used by the platform identity authentication certificate.

Step 806: The mobile terminal receives the user identity authentication negative acknowledgment information, and then ends this procedure.

Step 807: After receiving the platform identity authentication request, the authentication server obtains the platform identity authentication certificate based on the platform identity authentication certificate information in the platform identity authentication request, and determines whether the obtained platform identity authentication certificate is consistent with the platform identity authentication certificate obtained based on the platform identity authentication certificate information in the user identity authentication request, and whether the third plaintext in the platform identity authentication request is consistent with a fourth plaintext obtained by decrypting the second ciphertext by using a public key; and if yes, performs step 808; or otherwise, performs step 809, where the public key is a public key in the platform authentication certificate determined based on the platform identity authentication certificate information in the platform identity authentication request.

Step 808: The authentication server sends platform identity authentication acknowledgment information to the mobile terminal, and then step 810 is performed.

Step 809: The authentication server sends platform identity authentication negative acknowledgment information to the mobile terminal, and then step 811 is performed.

Step 810: After receiving the platform identity authentication acknowledgment information, the mobile terminal sends a platform integrity authentication request to the authentication server, where the request carries a fifth plaintext, a third ciphertext obtained by encrypting the fifth plaintext by using the private key for the platform identity authentication certificate, and the platform identity authentication certificate information of the terminal, where the fifth plaintext is a platform integrity measurement value encrypted by using the private key for the platform identity authentication certificate; and then step 812 is performed, where the platform identity authentication certificate information includes the information about the platform authentication device that generates the platform identity authentication certificate, the index number of the platform identity authentication certificate stored in the platform authentication device, and the information about the release number used by the platform identity authentication certificate.

Step 811: The mobile terminal receives the platform identity authentication negative acknowledgment information, and then ends this procedure.

Step 812: After receiving the platform integrity authentication request, the authentication server obtains the platform identity authentication certificate based on the platform identity authentication certificate information in the platform integrity authentication request, determines whether the obtained platform identity authentication certificate is consistent with the platform identity authentication certificate obtained based on the platform identity authentication certificate information in the user identity authentication request, and whether the fifth plaintext in the platform identity authentication request is consistent with a sixth plaintext obtained by decrypting the third ciphertext by using the public key, and determines, based on the platform integrity measurement value, that platform integrity authentication of the platform corresponding to the mobile terminal succeeds; and if yes, performs step 813; or otherwise, performs step 814, where the public key is a public key in a platform authentication certificate determined based on the platform identity authentication certificate information in the platform integrity authentication request.

Step 813: The authentication server sends platform integrity authentication acknowledgment information to the mobile terminal, and then step 815 is performed.

Step 814: The authentication server sends platform integrity authentication negative acknowledgment information to the mobile terminal, and then step 816 is performed.

Step 815: The mobile terminal receives the platform integrity authentication acknowledgment information, and then ends this procedure.

Step 816: The mobile terminal receives the platform integrity authentication negative acknowledgment information, and then ends this procedure.

The user identity authentication acknowledgment information is used to indicate that user identity authentication of the terminal succeeds, and the user identity authentication negative acknowledgment information is used to indicate that the user identity authentication of the terminal fails. The platform identity authentication acknowledgment information is used to indicate that the platform identity authentication of the platform corresponding to the terminal succeeds, and the platform identity authentication negative acknowledgment information is used to indicate that the platform identity authentication of the platform corresponding to the terminal fails. The platform integrity authentication acknowledgment information is used to indicate that the platform integrity authentication of the platform corresponding to the terminal succeeds, and the platform integrity authentication negative acknowledgment information is used to indicate that the platform integrity authentication of the platform corresponding to the terminal fails.

In the foregoing method, when the platform identity authentication certificate information in the user identity authentication request sent by the terminal is valid, and the platform identity authentication certificate information in the platform identity authentication request sent by the terminal is valid, the authentication server sends the platform identity authentication acknowledgment information to the terminal only when the platform identity authentication certificate determined based on the platform identity authentication certificate information in the user identity authentication request is consistent with the platform identity authentication certificate determined based on the platform identity authentication certificate information in the platform identity authentication request, so that a user identity authentication process of the terminal and a platform identity authentication process of the terminal can be bound together in a trusted network connection authentication process, to prevent an attacker from attacking a network by simulating user identity information of another authorized terminal, thereby avoiding a potential network security risk.

In addition, the authentication server sends the platform integrity authentication acknowledgment information to the terminal only when the platform identity authentication certificate determined based on the platform identity authentication certificate information in the user identity authentication request is consistent with the platform identity authentication certificate determined based on the platform identity authentication certificate information in the platform integrity authentication request, so that a user identity authentication process of the terminal and a platform integrity authentication process of the terminal are bound together, to prevent an attacker from attacking a network by simulating user identity information of another authorized terminal, thereby further avoiding a potential network security risk.

In addition, in the foregoing method, the authentication server sends the user identity authentication acknowledgment information to the terminal only when the user identity authentication of the terminal succeeds and the first plaintext in the user identity authentication request sent by the terminal is consistent with the second plaintext obtained by decrypting the first ciphertext. Because the foregoing comparison process can ensure that the private key used to encrypt the first plaintext to obtain the first ciphertext and the public key used to decrypt the first ciphertext to obtain the second plaintext are a corresponding public key and private key, in other words, an authentication certificate of the platform corresponding to the terminal 101 corresponds to an authentication certificate system of the platform determined by the server 102 based on the second authentication information, thereby further preventing an attacker from attacking a network by using a fake platform identity authentication certificate and information about the fake platform identity authentication certificate in a trusted network connection authentication process, and improving network security.

For a same reason, the authentication server sends the user identity authentication acknowledgment information to the terminal only when the platform identity authentication of the platform corresponding to the terminal succeeds and the third plaintext in the platform identity authentication request sent by the terminal is consistent with the fourth plaintext obtained by decrypting the second ciphertext; and the authentication server sends the platform integrity authentication acknowledgment information to the terminal only when the platform integrity authentication of the platform corresponding to the terminal succeeds and the fifth plaintext in the platform integrity request sent by the terminal is consistent with the sixth plaintext obtained by decrypting the third ciphertext, thereby further preventing an attacker from attacking a network by using a fake platform identity authentication certificate and information about the fake platform identity authentication certificate in a trusted network connection authentication process, and improving network security.

Optionally, in this embodiment of this application, a trusted platform module of the terminal is a software trusted platform module (Soft TPM, sTPM, etc.), and the terminal implements a network access authentication process in this embodiment of this application based on the software trusted platform module.

In a feasible implementation and/or embodiment, a securely isolated trusted execution environment (TEE) may be constructed based on a trustzone, and a TPM module constructed by using software is deployed in the trusted execution environment to provide a trusted service for the terminal. In addition, a TNC client and an integrity measurement collector are deployed in the trusted execution environment constructed based on the trustzone, to ensure operation security of the TNC client and the integrity measurement collector. In addition, a trusted software stack (TSS) and an sTPM may be separately deployed in a rich execution environment (REE) (referred to as a common zone below) and a trusted execution environment (referred to as a trustzone below). The TSS and the sTPM may communicate with each other in an original communication manner between the common zone and the trustzone by using a trusted application (TA).

Figure 9:
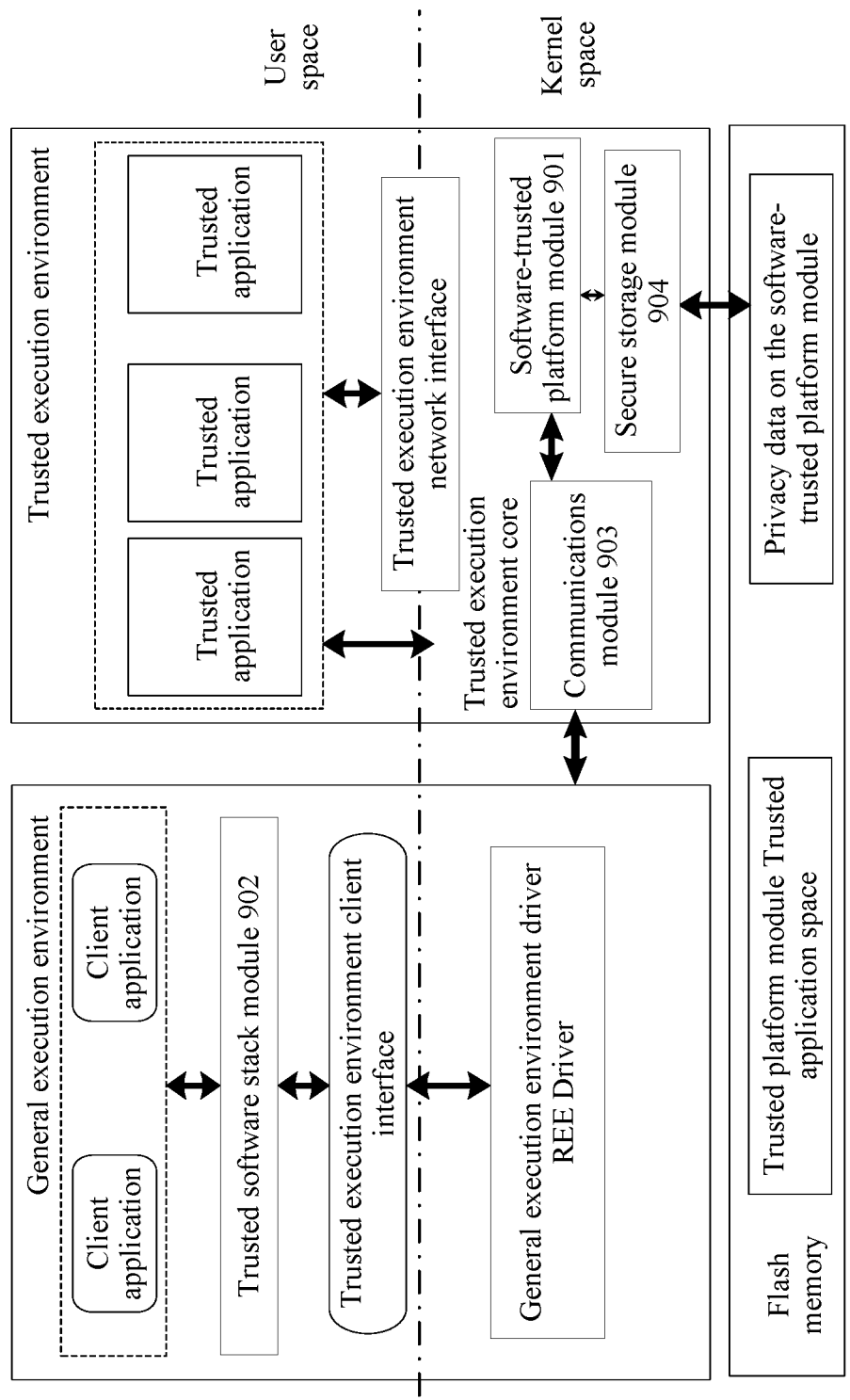
FIG. 9 is a schematic architectural diagram of a software-implemented trusted platform module according to an embodiment of this application.

A trustzone-based sTPM implementation architecture is shown in FIG. 9. A terminal implements a method for authenticating network access of the terminal according to an embodiment of this application by using an sTPM module 901, a TSS module 902, a communications module 903, and a secure storage module 904.

The sTPM module 901 implements TPM emulation in a software manner, and may provide a complete TPM function, such as encryption, decryption, and measurement. An Open-source Secure Sockets Layer Protocol (OpenSSL) encryption library and Chinese national encryption algorithms SM 2, SM 3, and SM 4 are added, to provide encryption and decryption algorithm support for an sTPM. To ensure operation security of the sTPM, the sTPM runs in an operating system of a trustzone. The sTPM module further needs to include sTPM identity information. Because the sTPM lacks an endorsement key, a terminal endorsement key may be built into a device privacy zone when the terminal is delivered from factory, and is not allowed to change and is protected and accessed by the trustzone. During network access authentication, a public key and a private key of a platform identity authentication certificate are generated based on the terminal endorsement key.

As a trusted software stack, the TSS module 902 runs in a common zone, and provides a user with a simple application programming interface (API) for invoking the sTPM module 901, so that an upper-layer user invokes the sTPM module 901.

The communications module 903 is configured to implement a communication function between the TSS module 902 in the common zone and the sTPM module 901 in the trustzone. In this embodiment of this application, based on a trustzone standard, an sTPM command generated by the sTPM module may be sent to the trustzone by invoking a trusted execution environment client interface (TEE Client API) in the TSS module 902. A communications trusted application (TA) is designed in the trustzone to receive a command sent by the TSS module 902 and forward the command to the sTPM module 901. The sTPM module 901 processes the command and sends the command to the TSS module 902 to complete a process in which a user invokes an sTPM of a terminal.

Figure 10:
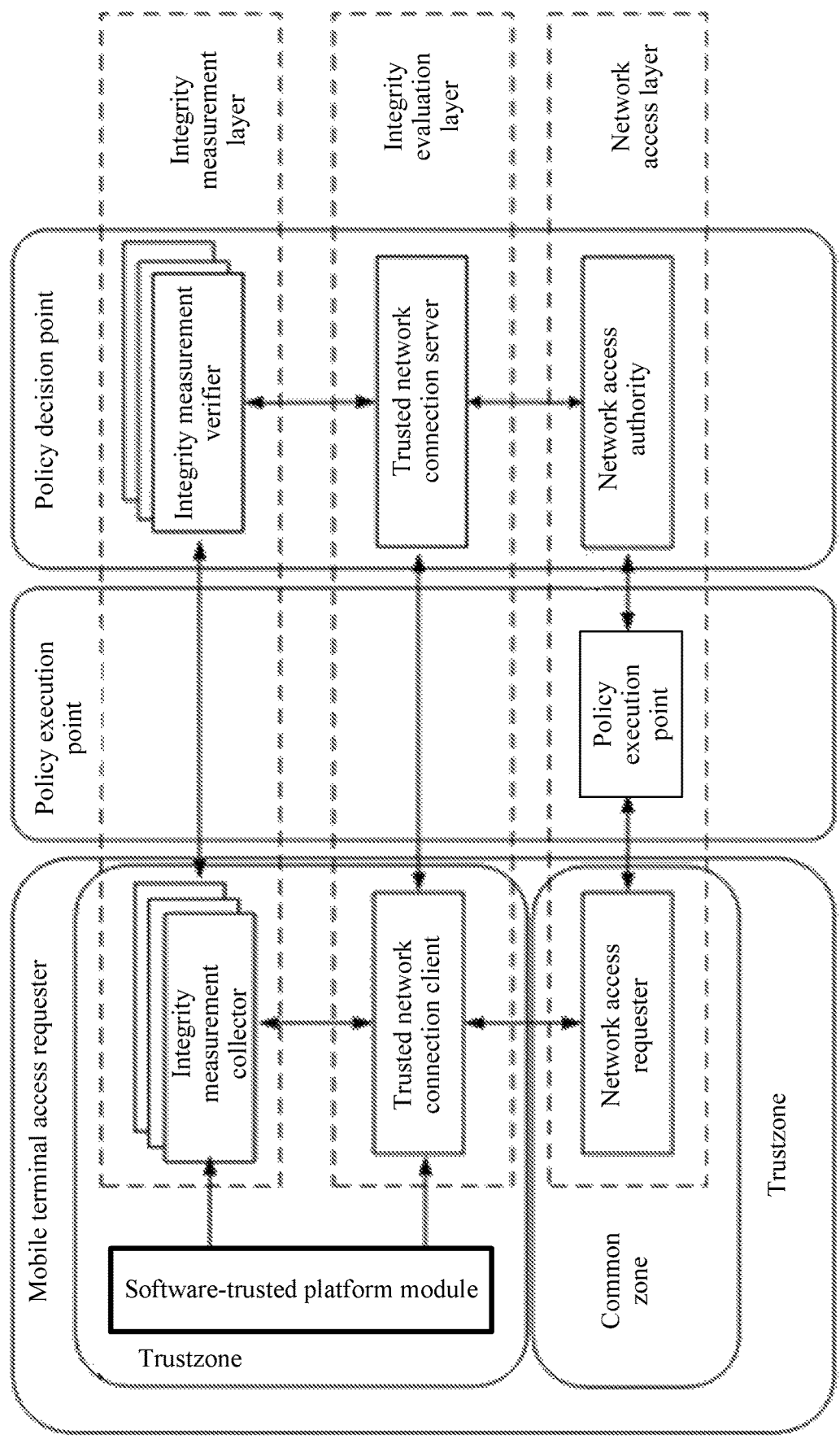
FIG. 10 is a schematic architectural diagram of performing a trusted network connection authentication process by using a software-trusted platform module according to an embodiment of this application.

As shown in FIG. 10, in a possible implementation, when trusted network connection authentication provided in an embodiment of this application is implemented based on software, when requesting, by using a NAR, a PDP (that is, an authentication server) to perform user identity authentication, an AR (that is, a terminal) carries information about a platform identity authentication certificate obtained from an sTPM, and when requesting, by using a TNCC, the PDP to perform platform identity authentication, the AR carries the information about the platform identity authentication certificate obtained from the sTPM. The PDP sends, to the AR only when the PDP determines, by using a TNCS, that a platform identity authentication certificate corresponding to platform identity authentication certificate information sent by the AR during user identity authentication is consistent with a platform identity authentication certificate corresponding to platform identity authentication certificate information sent by the AR during platform identity authentication, a result indicating that the platform identity authentication succeeds. In addition, when performing platform integrity authentication with an IMV of the PDP by using an IMC, the AR may carry the information about the platform identity authentication certificate obtained from the sTPM, and the PDP performs the platform integrity authentication after determining, by using the TNCS, that a platform identity authentication certificate to which platform identity authentication certificate information sent by the AR during user identity authentication belongs is consistent with a platform identity authentication certificate to which platform identity authentication certificate information sent by the AR during platform integrity authentication belongs.

Because a trusted platform module may be implemented by using software, in this embodiment of this application, a software-implemented trusted platform module may be provided for a terminal whose hardware chip is difficult to extend, such as a mobile terminal or an embedded device, to support the terminal in implementing the method for authenticating network access of a terminal according to this embodiment of this application.

Based on a same concept as the foregoing method embodiments, an embodiment of this application further provides a terminal, configured to implement a method in this embodiment of this application. The terminal may have the structure shown in FIG. 4.

Based on a same concept as the foregoing method embodiments, an embodiment of this application further provides an authentication server, configured to implement a method in this embodiment of this application. The authentication server may have the structure shown in FIG. 5.

Based on a same concept as the foregoing method embodiments, an embodiment of this application further provides a system, configured to implement a method in this embodiment of this application. The system may include the terminal shown in FIG. 4 and the authentication server shown in FIG. 5.

Based on a same concept as the foregoing method embodiments, an embodiment of this application further provides a computer readable storage medium, and the computer readable storage medium stores some instructions. When the instructions are invoked and executed, a terminal may execute functions in any one of the foregoing method embodiments and the possible designs of the method embodiments. In this embodiment of this application, the readable storage medium is not limited, for example, the readable storage medium may be a random-access memory (RAM) or a read-only memory (ROM).

Based on a same concept as the foregoing method embodiments, an embodiment of this application further provides a computer readable storage medium, and the computer readable storage medium stores some instructions. When the instructions are invoked and executed, an authentication server may execute functions in any one of the foregoing method embodiments and the possible designs of the method embodiments. In this embodiment of this application, the readable storage medium is not limited, for example, the readable storage medium may be a RAM or a ROM.

Based on a same concept as the foregoing method embodiments, an embodiment of this application further provides a computer program product. When the computer program product is run by a computer, a terminal may execute functions in any one of the foregoing method embodiments and the possible designs of the method embodiments.

Based on a same concept as the foregoing method embodiments, an embodiment of this application further provides a computer program product. When the computer program product is run by a computer, an authentication server may execute functions in any one of the foregoing method embodiments and the possible designs of the method embodiments.

Persons skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some possible embodiments of this application have been described, persons skilled in the art can make changes and modifications to these embodiments once they learn the basic inventive concept. Therefore, the appended claims are construed as to cover the embodiments of this application and all changes and modifications falling within the scope of this application.

Obviously, persons skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A method for authenticating network access of a terminal, comprising:

sending, by the terminal, a user identity authentication request to an authentication server, wherein the user identity authentication request comprises first authentication information and second authentication information, the first authentication information is used by the authentication server to authenticate a user identity of the terminal, and the second authentication information is used by the authentication server to determine a platform corresponding to the terminal;

after receiving user identity authentication acknowledgment information sent by the authentication server, sending, by the terminal, a platform identity authentication request to the authentication server, wherein the platform identity authentication request comprises third authentication information; and receiving, by the terminal, platform identity authentication acknowledgment information sent by the authentication server, wherein the platform identity authentication acknowledgment information is sent after the authentication server determines, based on the second authentication information and the third authentication information, that a platform corresponding to the platform identity authentication request is consistent with a platform corresponding to the second authentication information.

2. The method according to claim 1, wherein the first authentication information comprises a user identity authentication certificate, the second authentication information comprises identity authentication certificate information of the platform corresponding to the terminal, and the third authentication information comprises identity authentication certificate information of the platform corresponding to the terminal, and wherein the identity authentication certificate information is used by the authentication server to determine an identity authentication certificate of the platform corresponding to the terminal.

3. The method according to claim 2, wherein the third authentication information is the same as the second authentication information.

4. The method according to claim 3, wherein the platform identity authentication request further comprises a third plaintext and a second ciphertext obtained by encrypting the third plaintext by using a private key for the identity authentication certificate of the platform corresponding to the terminal, the third plaintext is used to match a fourth plaintext, and the fourth plaintext is a plaintext obtained by decrypting the second ciphertext by using a public key in a platform identity authentication certificate determined based on the third authentication information.

5. The method according to claim 2, wherein the user identity authentication request further comprises a first plaintext and a first ciphertext obtained by encrypting the first plaintext using a private key for the identity authentication certificate of the platform corresponding to the terminal, the first plaintext is used to match a second plaintext, and the second plaintext is a plaintext obtained by decrypting the first ciphertext using a public key in a platform identity authentication certificate determined based on the second authentication information.

6. The method according to claim 1, wherein after the receiving, by the terminal, platform identity authentication acknowledgment information sent by the authentication server, the method further comprises:
sending, by the terminal, a platform integrity authentication request to the authentication server, wherein the platform integrity authentication request comprises fourth authentication information and fifth authentication information, the fourth authentication information is used by the authentication server to verify whether platform integrity authentication of the platform corresponding to the terminal succeeds, and the fifth authentication information is used by the authentication server to determine the platform corresponding to the terminal, and is used by the authentication server to determine, based on that the platform corresponding to the second authentication information is consistent with the platform corresponding to a fifth authentication information, that the user identity authentication request and the platform integrity authentication request are sent by the same terminal; and
receiving, by the terminal, platform integrity authentication acknowledgment information sent by the authentication server.

7. The method according to claim 6, wherein the fifth authentication information comprises identity authentication certificate information of the platform corresponding to the terminal, the platform integrity authentication request further comprises a fifth plaintext and a third ciphertext obtained by encrypting the fifth plaintext using a private key for an identity authentication certificate of the platform corresponding to the terminal, the fifth plaintext is used to match a sixth plaintext, and the sixth plaintext is a plaintext obtained by decrypting the third ciphertext using a public key in a platform identity authentication certificate determined based on the fifth authentication information.

8. The method according to claim 6, wherein the first authentication information is a user identity authentication certificate, the second authentication information, the third authentication information, and the fifth authentication information are index information of an attestation identity key (AIK) certificate of the platform corresponding to the terminal, and the fourth authentication information is a platform integrity measurement value.

9. A terminal for authenticating network access of the terminal, comprising:
a transceiver configured for communication between the terminal and an authentication server; and
a processor coupled with the transceiver configured to:
control the transceiver to send a user identity authentication request to the authentication server, wherein the user identity authentication request comprises first authentication information and second authentication information, the first authentication information is used by the authentication server to authenticate a user identity of the terminal, and the second authentication information is used by the authentication server to determine a platform corresponding to the terminal,
after receiving, by the transceiver, user identity authentication acknowledgment information sent by the authentication server, control the transceiver to send a platform identity authentication request to the authentication server, wherein the platform identity authentication request comprises third authentication information, and
receive, by the transceiver, platform identity authentication acknowledgment information sent by the authentication server, wherein the platform identity authentication acknowledgment information is sent after the authentication server determines, based on the second authentication information and the third authentication information, that a platform corresponding to the platform identity authentication request is consistent with a platform corresponding to the second authentication information.

10. The terminal according to claim 9, wherein the first authentication information comprises a user identity authentication certificate, the second authentication information comprises identity authentication certificate information of the platform corresponding to the terminal, and the third authentication information comprises identity authentication certificate information of the platform corresponding to the terminal, and wherein the identity authentication certificate information is used by the authentication server to determine an identity authentication certificate of the platform corresponding to the terminal.

11. The terminal according to claim 10, wherein the third authentication information is the same as the second authentication information.

12. The terminal according to claim 11, wherein the platform identity authentication request further comprises a third plaintext and a second ciphertext obtained by encrypting the third plaintext by using a private key for the identity authentication certificate of the platform corresponding to the terminal, the third plaintext is used to match a fourth plaintext, and the fourth plaintext is a plaintext obtained by decrypting the second ciphertext by using a public key in a platform identity authentication certificate determined based on the third authentication information.

13. The terminal according to claim 10, wherein the user identity authentication request further comprises a first plaintext and a first ciphertext obtained by encrypting the first plaintext using a private key for the identity authentication certificate of the platform corresponding to the terminal, the first plaintext is used to match a second plaintext, and the second plaintext is a plaintext obtained by decrypting the first ciphertext using a public key in a platform identity authentication certificate determined based on the second authentication information.

14. The terminal according to claim 9, wherein the processor is further configured to:
after receiving, by using the transceiver, the platform identity authentication acknowledgment information sent by the authentication server, send a platform integrity authentication request to the authentication server by using the transceiver, wherein the platform integrity authentication request comprises fourth authentication information and fifth authentication information, the fourth authentication information is used by the authentication server to verify whether platform integrity authentication of the platform corresponding to the terminal succeeds, and the fifth authentication information is used by the authentication server to determine the platform corresponding to the terminal, and is used by the authentication server to determine, based on that the platform corresponding to the second authentication information is consistent with the platform corresponding to a fifth authentication information, that the user identity authentication request and the platform integrity authentication request are sent by the same terminal; and receive, by using the transceiver, platform integrity authentication acknowledgment information sent by the authentication server.

15. The terminal according to claim 14, wherein the fifth authentication information comprises identity authentication certificate information of the platform corresponding to the terminal, the identity authentication certificate information is used by the authentication server to determine an identity authentication certificate of the platform corresponding to the terminal, the platform integrity authentication request further comprises a fifth plaintext and a third ciphertext obtained by encrypting the fifth plaintext using a private key for the identity authentication certificate of the platform corresponding to the terminal, the fifth plaintext is used to match a sixth plaintext, and the sixth plaintext is a plaintext obtained by decrypting the third ciphertext using a public key in a platform identity authentication certificate determined based on the fifth authentication information.

16. The terminal according to claim 14, wherein the first authentication information is a user identity authentication certificate, the second authentication information, the third authentication information, and the fifth authentication information are index information of an attestation identity key (AIK) certificate of the platform corresponding to the terminal, and the fourth authentication information is a platform integrity measurement value.

17. A method for authenticating network access of a terminal, comprising:

receiving, by an authentication server, a user identity authentication request sent by the terminal, wherein the user identity authentication request comprises first authentication information and second authentication information;

authenticating a user identity of the terminal based on the first authentication information, and determining, based on the second authentication information, a platform corresponding to the terminal;

when the user identity of the terminal is authenticated, sending, by the authentication server, user identity authentication acknowledgment information to the terminal, wherein the user identity authentication acknowledgment information is used to indicate that user identity authentication of the terminal succeeds;

receiving, by the authentication server, a platform identity authentication request sent by the terminal, wherein the platform identity authentication request comprises third authentication information;

authenticating a platform identity corresponding to the terminal, and determining, based on the second authentication information and the third authentication information, whether the platform corresponding to the second authentication information is consistent with a platform corresponding to the third authentication information; and when the platform identity corresponding to the terminal is authenticated, and a platform corresponding to the second authentication information is consistent with a platform corresponding to the third authentication information, sending, by the authentication server, platform identity authentication acknowledgment information to the terminal, wherein the platform identity authentication acknowledgment information is used to indicate that platform identity authentication of the terminal succeeds.

18. The method according to claim 17, wherein the first authentication information comprises a user identity authentication certificate, the second authentication information comprises identity authentication certificate information of the platform corresponding to the terminal, and the third authentication information comprises identity authentication certificate information of the platform corresponding to the terminal, and wherein the identity authentication certificate information is used by the authentication server to determine an identity authentication certificate of the platform corresponding to the terminal.

19. The method according to claim 18, wherein the third authentication information is the same as the second authentication information.

20. The method according to claim 18, wherein the user identity authentication request further comprises a first plaintext and a first ciphertext obtained by encrypting the first plaintext using a private key for the identity authentication certificate of the platform corresponding to the terminal; and before the sending, by the authentication server, user identity authentication acknowledgment information to the terminal, the method further comprises:

determining a public key in a platform identity authentication certificate based on the identity authentication certificate information of the platform that is comprised in the second authentication information;

decrypting the first ciphertext based on the public key to obtain a second plaintext; and determining that the first plaintext is consistent with the second plaintext.

* * * * *